United States Patent
Kataoka et al.

(10) Patent No.: US 11,656,487 B2
(45) Date of Patent: May 23, 2023

(54) OPTICAL WAVEGUIDE ELEMENT, AND OPTICAL MODULATION DEVICE AND OPTICAL TRANSMISSION APPARATUS USING OPTICAL WAVEGUIDE ELEMENT

(71) Applicant: SUMITOMO OSAKA CEMENT CO., LTD., Tokyo (JP)

(72) Inventors: Yu Kataoka, Tokyo (JP); Shingo Takano, Tokyo (JP); Norikazu Miyazaki, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 17/490,590

(22) Filed: Sep. 30, 2021

(65) Prior Publication Data

US 2022/0100010 A1 Mar. 31, 2022

(30) Foreign Application Priority Data

Sep. 30, 2020 (JP) .............................. JP2020-165002

(51) Int. Cl.
*G02F 1/035* (2006.01)

(52) U.S. Cl.
CPC ...... *G02F 1/0353* (2013.01); *G02F 2201/063* (2013.01)

(58) Field of Classification Search
CPC .. G02F 1/0353; G02F 2201/063; G02F 1/212; G02F 1/225; G02B 2006/12097; G02B 6/02109; G02B 6/105; G02B 6/126; G02B 6/29302; G02B 2006/1204
See application file for complete search history.

(56) References Cited

U.S. PATENT DOCUMENTS

| 5,838,869 | A | 11/1998 | Rasch |
| 11,366,268 | B2 * | 6/2022 | Lin .......................... G02B 6/13 |
| 2002/0006245 | A1 | 1/2002 | Kubota et al. |
| 2003/0194164 | A1 | 10/2003 | Doi et al. |
| 2015/0277156 | A1 | 10/2015 | Kondou |
| 2017/0052424 | A1 | 2/2017 | Iwatsuka |

FOREIGN PATENT DOCUMENTS

| JP | 2009244812 A | 10/2009 |
| WO | 2004008202 A2 | 1/2004 |

* cited by examiner

*Primary Examiner* — John Bedtelyon
(74) *Attorney, Agent, or Firm* — IpHorgan Ltd.

(57) ABSTRACT

An optical waveguide element includes a substrate and an optical waveguide that is disposed on the substrate. The optical waveguide has an effective refractive index change portion in which an effective refractive index of the optical waveguide related to a fundamental mode A parallel to a plane of polarization of a light wave propagated through the optical waveguide changes according to propagation of the light wave. In the effective refractive index change portion, a cross-sectional shape of the optical waveguide which is perpendicular to a propagation direction of the light wave is set such that the effective refractive index of the optical waveguide related to the fundamental mode A is higher than an effective refractive index of the optical waveguide related to another fundamental mode B perpendicular to the fundamental mode A.

16 Claims, 9 Drawing Sheets

OPTICAL WAVEGUIDE ELEMENT, AND OPTICAL MODULATION DEVICE AND OPTICAL TRANSMISSION APPARATUS USING OPTICAL WAVEGUIDE ELEMENT

CROSS-REFERENCE TO RELATED APPLICATIONS

This application claims the benefit of Japanese Patent Application No. 2020-165002 filed Sep. 30, 2020, the disclosure of which is herein incorporated by reference in its entirety.

BACKGROUND OF THE INVENTION

Field of the Invention

The present invention relates to an optical waveguide element, and an optical modulation device and an optical transmission apparatus using the optical waveguide element, and particularly to an optical waveguide element which includes a substrate and an optical waveguide disposed on the substrate and in which an effective refractive index related to a specific fundamental mode of a light wave propagated through the optical waveguide changes.

Description of Related Art

Figure 1A:
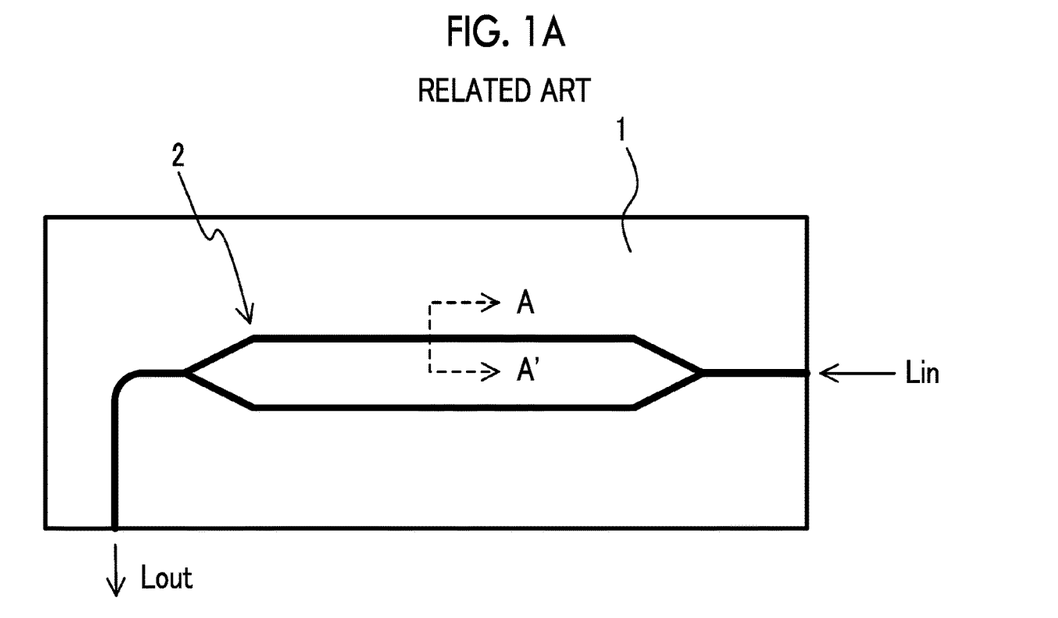
FIG. 1A is a diagram showing an example in which an optical waveguide of an optical waveguide element according to the related art is bent is bent at 90 degrees.
Figure 1B:
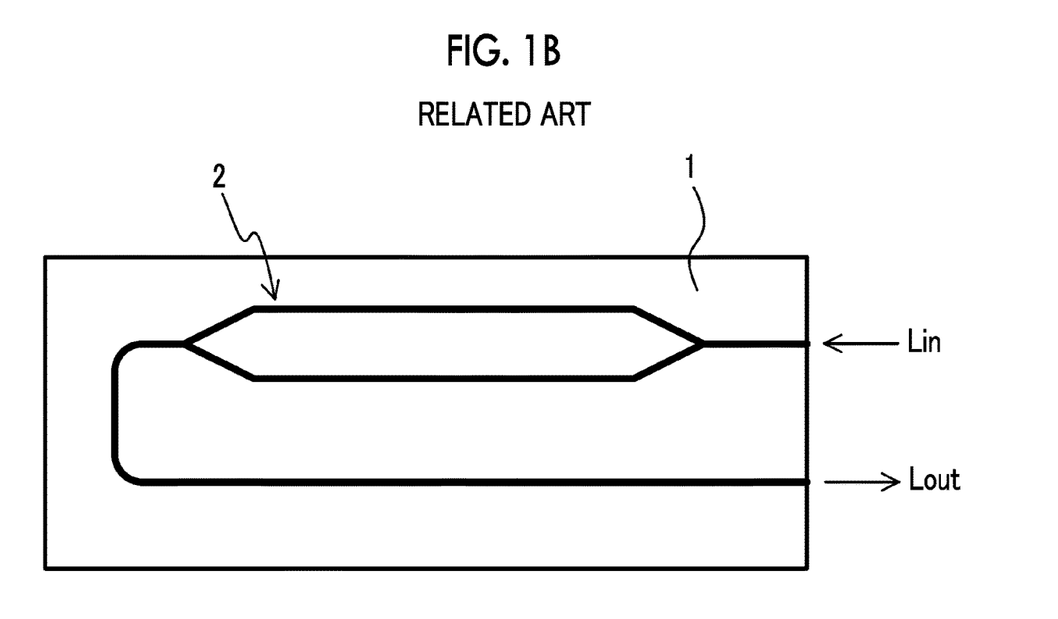
FIG. 1B is a diagram showing an example in which the optical waveguide is bent at 180 degrees.

In the fields of optical measurement technology and optical communication technology, an optical waveguide element using a substrate on which an optical waveguide is formed, such as an optical modulator, is generally used. In recent years, the miniaturization of optical modulators and the like has been required. As one of means for solving the requirement, the following has been proposed: as shown in FIGS. 1A and 1B, a portion of an optical waveguide 2 formed in an optical waveguide element is bent at 90 degrees or more; and the input direction and output direction of light are bent at 90 degrees as shown in FIG. 1A, or the input direction and output direction of light are bent at 180 degrees as shown in FIG. 1B.

Figure 2:
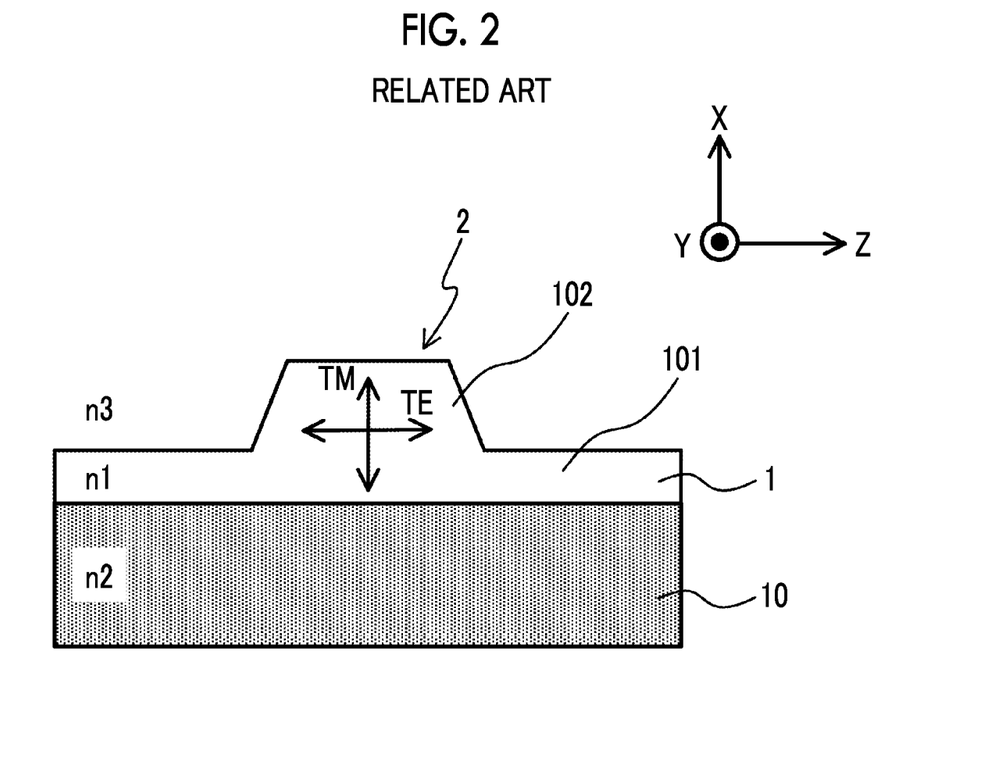
FIG. 2 is a cross-sectional view taken along the dotted line A-A' of FIG. 1A.

It is indispensable to increase optical confinement strength in order to bend the optical waveguide. As described in Japanese Laid-open Patent Publication No. 2017-129834 and FIG. 2, a rib-type optical waveguide is used. FIG. 2 is a cross-sectional view taken along the dotted line A-A' of FIG. 1A. A waveguide layer 1 is extremely thin and has a thickness of about several micrometers. In FIG. 2, the waveguide layer 1 includes a rib-type portion 102 that protrudes from a thin film portion 101.

The rib-type optical waveguide shown in FIG. 2 has a strong optical confinement and has an advantage that light waves can be propagated even through an optical waveguide having a small bending radius with low loss. However, a material having an electro-optic effect, such as lithium niobate (LN), is used for the waveguide layer. An anisotropic material whose refractive index varies depending on the axis (the X-axis, the Y-axis, or the Z-axis) shown in FIG. 2 is widely used.

Therefore, when the light wave is propagated through the optical waveguide, polarization rotation is likely to occur. That is, a TE mode shown in FIG. 2 rotates and shifts to a TM mode. Therefore, the mode is converted into a mode orthogonal to input light, which results in loss. In addition, the conversion of the mode leads to the various kinds of characteristic deterioration, such as a reduction in modulation efficiency, wavelength dispersion, and inter-polarization crosstalk.

SUMMARY OF THE INVENTION

An object to be achieved by the invention is to solve the above-mentioned problems and to provide an optical waveguide element that suppresses polarization rotation. In addition, an object of the invention is to provide an optical modulation device and an optical transmission apparatus using the optical waveguide element.

In order to achieve the object, an optical waveguide element, and an optical modulation device and an optical transmission apparatus using the optical waveguide element according to the invention have the following technical features.

(1) An optical waveguide element includes a substrate and an optical waveguide that is disposed on the substrate. The optical waveguide has an effective refractive index change portion in which an effective refractive index of the optical waveguide related to a fundamental mode A parallel to a plane of polarization of a light wave propagated through the optical waveguide changes according to propagation of the light wave. In the effective refractive index change portion, a cross-sectional shape of the optical waveguide which is perpendicular to a propagation direction of the light wave is set such that the effective refractive index of the optical waveguide related to the fundamental mode A is higher than an effective refractive index of the optical waveguide related to another fundamental mode B perpendicular to the fundamental mode A.

(2) In the optical waveguide element according to (1), a relationship between levels of the effective refractive indices related to the fundamental mode A and the fundamental mode B may be maintained over the entire effective refractive index change portion.

(3) In the optical waveguide element according to (1) or (2), a waveguide layer which is made of a material having an electro-optic effect may be disposed on the substrate, the optical waveguide may be a rib-type optical waveguide that is provided on the waveguide layer, electrodes that apply an electric field to the rib-type optical waveguide may be formed on the waveguide layer, and the fundamental mode A may be a fundamental mode in which the electro-optic effect by the electrodes is higher with respect to the light wave propagated through the optical waveguide.

(4) In the optical waveguide element according to any one of (1) to (3), the optical waveguide may have a portion in which the propagation directions of the light wave differ by 90 degrees or more in at least one continuous optical waveguide.

(5) In the optical waveguide element according to any one of (1) to (4), the cross-sectional shape of the optical waveguide in the effective refractive index change portion may be set such that a thickness of the optical waveguide in a direction parallel to the fundamental mode B is less than 0.45 times a wavelength of the light wave propagated through the optical waveguide.

(6) In the optical waveguide element according to any one of (1) to (5), the cross-sectional shape of the optical waveguide in the effective refractive index change portion may be set such that a thickness of the optical waveguide in a direction parallel to the fundamental mode A is larger than a thickness of the optical waveguide in a direction parallel to the fundamental mode B.

(7) In the optical waveguide element according to any one of (1) to (6), a refractive index of the substrate may be less than 0.8 times a refractive index of a waveguide layer forming the optical waveguide.

(8) In the optical waveguide element according to any one of (1) to (6), a low-refractive-index layer may be disposed on a side of a waveguide layer forming the optical waveguide opposite to the substrate, and a refractive index of the low-refractive-index layer may be less than 0.8 times a refractive index of the waveguide layer.

(9) In the optical waveguide element according to any one of (1) to (8), a waveguide layer forming the optical waveguide may include a thin film portion which has a small thickness and contacts with the substrate and a rib portion which protrudes from the thin film portion, and a thickness of the thin film portion may be less than 0.7 times a thickness of the entire waveguide layer.

(10) In the optical waveguide element according to (9), grooves may be formed in the thin film portion on both sides of the rib portion.

(11) In the optical waveguide element according to any one of (1) to (10), the optical waveguide may be a rib-type optical waveguide, and an angle formed between a side surface of the rib-type optical waveguide and a contact surface disposed between the substrate and a waveguide layer forming the optical waveguide may be more than 50 degrees.

(12) In the optical waveguide element according to any one of (1) to (11), the optical waveguide may have a bent portion, and a minimum bending radius of the bending portion may be less than 300 μm.

(13) In the optical waveguide element according to any one of (1) to (12), the electrodes applying the electric field to the optical waveguide may be disposed on lateral sides of the optical waveguide such that the optical waveguide is interposed between the electrodes.

(14) An optical modulation device includes: the optical waveguide element according to any one of (1) to (13); a case that accommodates the optical waveguide element; and an optical fiber that inputs the light wave to the optical waveguide or outputs the light wave from the optical waveguide.

(15) The optical modulation device according to (14) may further include: an electronic circuit that amplifies a modulation signal input to the optical waveguide element. The electronic circuit may be provided in the case.

(16) An optical transmission apparatus includes: the optical modulation device according to (14) or (15); and an electronic circuit that outputs a modulation signal for causing the optical modulation device to perform a modulation operation.

The invention can provide an optical waveguide element including a substrate and an optical waveguide that is disposed on the substrate. The optical waveguide has an effective refractive index change portion in which an effective refractive index of the optical waveguide related to a fundamental mode A parallel to a plane of polarization of a light wave propagated through the optical waveguide changes according to propagation of the light wave. In the effective refractive index change portion, a cross-sectional shape of the optical waveguide which is perpendicular to a propagation direction of the light wave is set such that the effective refractive index of the optical waveguide related to the fundamental mode A is higher than an effective refractive index of the optical waveguide related to another fundamental mode B perpendicular to the fundamental mode A. Therefore, according to the optical waveguide element, the shift of the fundamental mode A to the fundamental mode B due to the polarization rotation of the fundamental mode A is suppressed, and the polarization rotation is suppressed.

DETAILED DESCRIPTION OF THE INVENTION

Hereinafter, an optical waveguide element according to the invention will be described in detail with reference to preferred examples.

Figure 3:
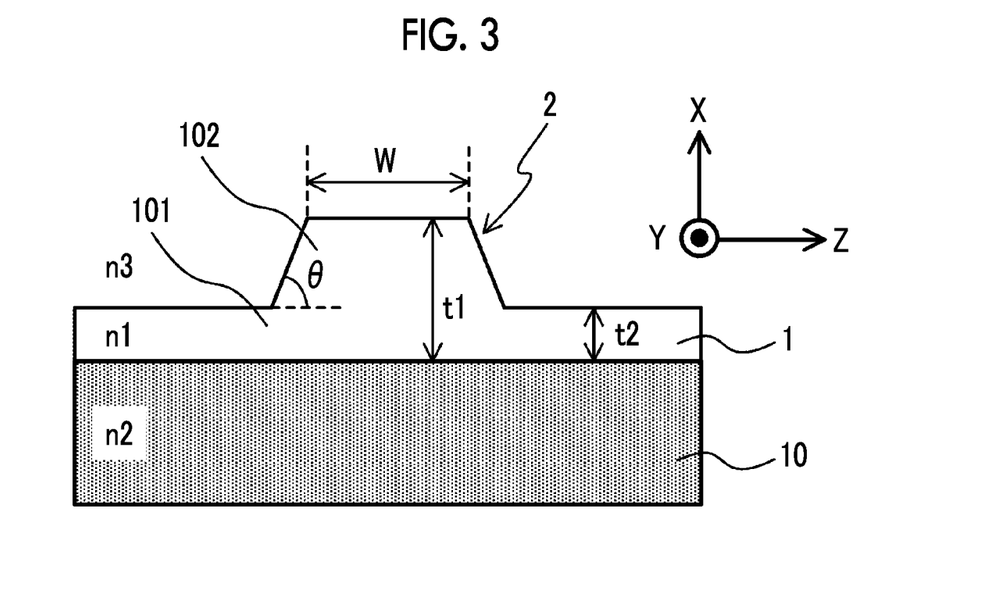
FIG. 3 shows an example of a cross-sectional shape of a rib-type optical waveguide according to the invention.

As shown in FIG. 3, the optical waveguide element according to the invention includes a substrate 10 and an optical waveguide 2 that is disposed on the substrate. The optical waveguide has an effective refractive index change portion in which an effective refractive index of the optical waveguide related to a fundamental mode A parallel to a plane of polarization of a light wave propagated through the optical waveguide changes according to the propagation of the light wave. In the effective refractive index change portion, the cross-sectional shape of the optical waveguide which is perpendicular to a propagation direction of the light wave is set such that the effective refractive index of the optical waveguide related to the fundamental mode A is higher than an effective refractive index of the optical waveguide related to another fundamental mode B perpendicular to the fundamental mode A.

For example, a ferroelectric material having an electro-optic effect can be used as a material forming a waveguide layer 1 used in the optical waveguide element according to the invention. Specifically, a substrate made of lithium niobate (LN), lithium tantalate (LT), or lead lanthan zirconate titanate (PLZT) or an epitaxial film made of these materials can be used as the material. In addition, various materials, such as semiconductor materials or organic materials, can be used as the substrate of the optical waveguide element. In particular, in a case in which an anisotropic material whose refractive index varies depending on the axis is used, the invention is preferably applicable.

The waveguide layer used in the invention has a very small thickness of about several micrometers. There is a method that mechanically polishes a crystal substrate made of, for example, LN to form a thin plate or a method that uses an epitaxial film made of, for example, LN. In the case of the epitaxial film, for example, as described in Japanese Laid-open Patent Publication No. 2017-129834, the epitaxial film is formed by a sputtering method, a CVD method, a sol-gel method, or the like according to the crystal orientation of a single crystal substrate, such as a $SiO_2$ substrate, a sapphire single crystal substrate, or a silicon single crystal substrate.

Since the thickness of the waveguide layer is small, a substrate 10 is disposed on a back surface side of the waveguide layer 1 in order to increase the mechanical strength of the optical waveguide element. It is preferable that a substrate made of a material having a lower refractive index than the waveguide layer, such as a $SiO_2$ substrate, is used. In addition, a substrate obtained by forming a layer having a low dielectric constant on a waveguide-layer-side surface of a substrate having a high refractive index, such as a silicon-on-insulator (SOI) substrate, may be used. Further, the waveguide layer may be directly bonded on the substrate 10, or the waveguide layer as an epitaxial film may be provided on the substrate 10 used as a base for crystal growth. Furthermore, the substrate 10 may be configured as a single body. Alternatively, a substrate including a plurality of layers may be used, which will be described below. Moreover, there is a method which attaches a plate-like body, such as an LN substrate, through an adhesive layer such as a resin. In this case, the adhesive layer and the plate-like body function as the substrate 10.

A rib-type protrusion constituting the optical waveguide can be formed by performing dry or wet etching on the waveguide layer. Further, a method which thermally diffuses a material with a high refractive index, such as Ti, at the position of a rib portion may be used in order to increase the refractive index of the rib portion.

Electrodes (not shown in FIG. 2) for applying an electric field to the optical waveguide, which will be described below, can be formed by forming metal, such as Au, on the substrate or the waveguide layer using a plating method. If necessary, a base electrode made of, for example, Ti or Au may be formed, and the electrodes may be stacked on the base electrode by a plating method. The base electrode can be patterned by a patterning method using, for example, a photoresist.

The optical waveguide element according to the invention is characterized in that the optical waveguide has the effective refractive index change portion in which the effective refractive index of the optical waveguide related to the fundamental mode A parallel to the plane of polarization of the light wave propagated through the optical waveguide changes according to the propagation of the light wave. Then, in the effective refractive index change portion, the cross-sectional shape of the optical waveguide perpendicular to the propagation direction of the light wave is set such that the effective refractive index of the optical waveguide related to the fundamental mode A is higher than the effective refractive index of the optical waveguide related to another fundamental mode B perpendicular to the fundamental mode A.

The meaning of "the plane of polarization of the light wave propagated through the optical waveguide" will be described. In the optical waveguide element, a specific plane of polarization of the light wave is generally used. The reason is as follows. When the plane of polarization of the light wave varies depending on the shape or structure of the optical waveguide and the state in which the electric field is applied to the optical waveguide, the refractive index may vary. Therefore, in general, a light wave having a specific plane of polarization is selected and used. The invention focuses on the selected light wave having the specific plane of polarization, and the "plane of polarization" of the light wave is expressed as described above.

The "fundamental modes" correspond to a "TE mode" and a "TM mode" shown in FIG. 2. In a case in which one "fundamental mode A" is the TE mode, an other "fundamental mode B" is the TM mode. Further, in a case in which the waveguide layer 1 made of a material having an electro-optic effect, such as LN, is used and the electric field is applied in the Z-axis direction in FIG. 3, X-cut LN is used, the plane of polarization of the selected light wave is the Z-axis direction, and the TE mode is the "fundamental mode A". In this case, the TE mode is a fundamental mode having a higher electro-optic effect.

The "effective refractive index change portion" indicates a portion in which the effective refractive index of the optical waveguide related to the "fundamental mode A" changes and specifically means, for example, a portion in which the propagation direction of the light wave changes in an anisotropic material having a different refractive index in the propagation direction of the light wave or a portion in which the shape of the optical waveguide changes during the propagation of the light wave since the refractive index changes depending on the shape of the optical waveguide. For example, in a case in which the X-cut LN is used for the waveguide layer 1, the range of the optical waveguide 2 from a portion in which the optical waveguide 2 extending to the Y direction in FIG. 3 starts to change the angle from the Y direction to the Z direction to a portion in which the optical waveguide 2 finally returns to the Y direction corresponds to the "effective refractive index change portion". In addition, this holds for a case in which the optical waveguide 2 is formed in a so-called tapered shape in which the width W of the optical waveguide 2 shown in FIG. 3 gradually changes in the propagation direction of the light wave.

In the optical waveguide element according to the invention, in the effective refractive index change portion, the effective refractive index of the optical waveguide related to the fundamental mode A is set to be higher than the effective refractive index of the optical waveguide related to the fundamental mode B. Therefore, polarization rotation causing the fundamental mode A to be shifted to the fundamental mode B is suppressed. Of course, it is desirable to maintain the relationship between the levels of the refractive indices related to the fundamental modes A and B over the entire effective refractive index change portion. However, in a case in which the shift of the fundamental mode A to the fundamental mode B is suppressed when the light wave is finally output from one end of the effective refractive index change portion even though the two refractive indices are reversed in a part of the effective refractive index change portion, the case is acceptable as the invention.

In the cross-sectional shape of the optical waveguide constituting the effective refractive index change portion, the width W and height (t1 or t1−t2) of the rib-type optical waveguide are set as shown in FIG. 3 to adjust the effective refractive index. In addition, if necessary, a material with a high refractive index which is diffused in the waveguide layer 1 may be partially changed.

In a case in which a material having an electro-optic effect is used for the waveguide layer 1, electrodes for applying the electric field to the rib-type optical waveguide are formed in a portion of the waveguide layer. The "fundamental mode A" according to the invention is a fundamental mode in which the electro-optic effect by the electrodes is higher with respect to the light wave propagated through the optical waveguide. For example, in a case in which the waveguide layer 1 is made of X-cut LN, the fundamental mode A is the TE mode. In a case in which the waveguide layer 1 is made of Z-cut LN, the fundamental mode A is the TM mode.

The waveguide layer 1 shown in FIG. 3 is made of, for example, an X-cut LN or LT crystal. In FIGS. 3, X, Y, and Z arrows indicate crystal axes, the X-axis direction is the vertical direction, and the Z-axis direction is the horizontal direction. In the LN crystal, the refractive index in the Z-axis direction is 2.138, and the refractive index in the X-axis direction or the Y-axis direction is 2.211. Then, the axial direction in which the electro-optic effect is high is the Z-axis direction, that is, the horizontal direction in FIG. 3. The electrodes for applying the electric field to the optical waveguide are disposed on the left and right sides of the optical waveguide (rib portion 102). The TE mode shown in FIG. 2 is the fundamental mode in the Z-axis direction.

On the other hand, the axial direction in which the electro-optic effect is low in FIG. 3 is the X-axis direction, and the fundamental mode formed in the X-axis direction is the TM mode shown in FIG. 2. The effective refractive index in the TE mode or the TM mode is affected by the height (the height of the waveguide layer) t1 or the width W of the rib-type optical waveguide shown in FIG. 3. Therefore, for example, the thickness (t1) of the waveguide layer of the rib-type optical waveguide shown in FIG. 3 can be controlled to suppress the conversion from the TE mode to the TM mode.

Figure 4:
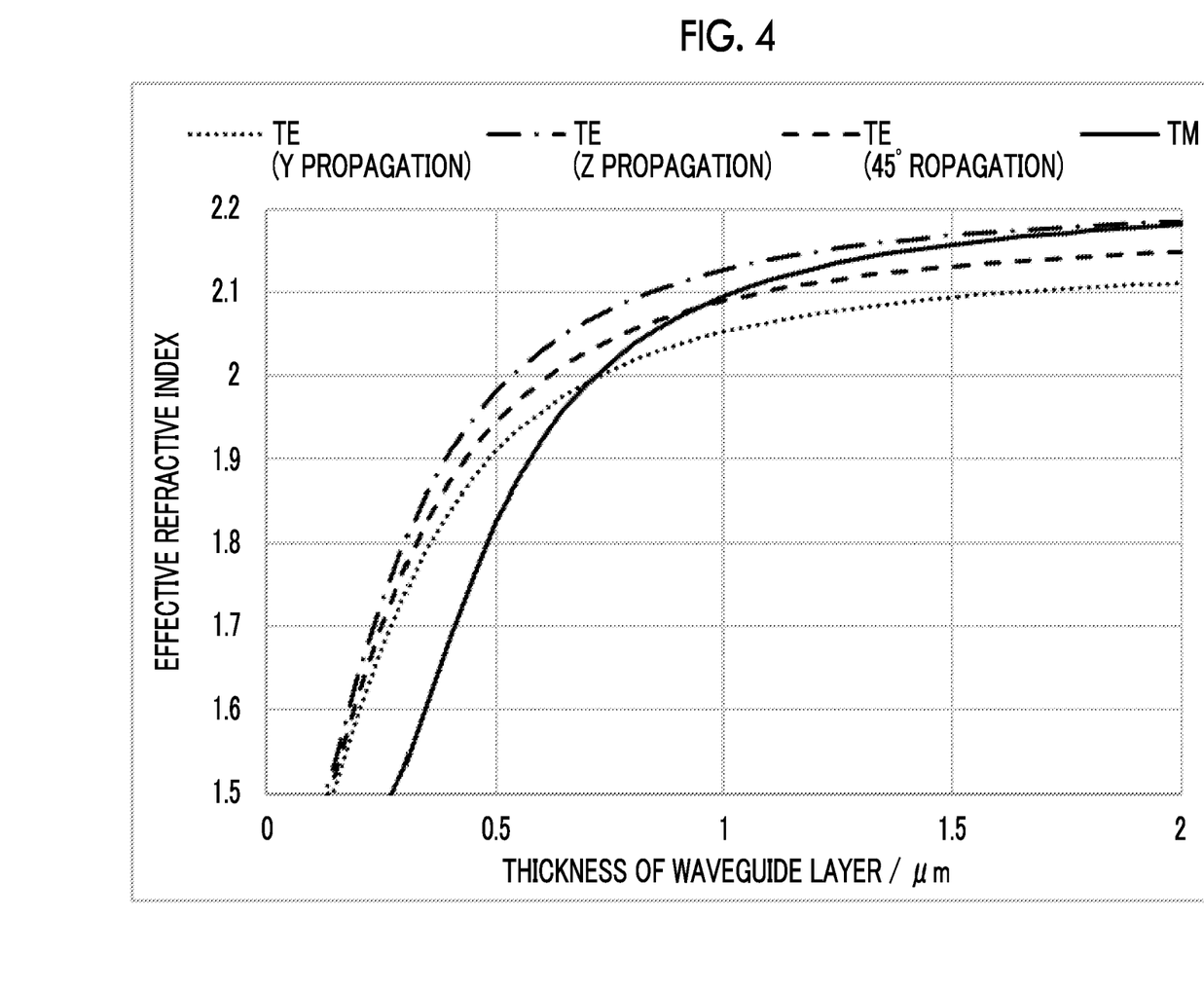
FIG. 4 is a graph showing a change in an effective refractive index with respect to a thickness of a waveguide layer in the rib-type optical waveguide.

FIG. 4 shows the examination result of changes in the effective refractive index with respect to the thickness of the waveguide layer. A three-layer slab waveguide is used in which a substrate (lower clad) is made of $SiO_2$ (a refractive index n2=1.44), the waveguide layer 1 is made of X-cut lithium niobate (LN) (a refractive index n1=2.138 (Z-axis)/ 2.211 (the X-axis and the Y-axis)), and an upper clad is air (a refractive index n3=1). Then, FIG. 4 shows dispersion curves (the wavelength λ of light=1.55 um) in each of the fundamental modes of the TE mode and the TM mode.

In FIG. 4, the horizontal axis indicates the thickness t1 of the waveguide layer, and the vertical axis indicates the effective refractive index for each of the propagation axes of the light wave. Propagation in the Y-axis direction (Y propagation), propagation in the Z-axis direction (Z propagation), and an intermediate direction between the Y-axis and the Z-axis (45° propagation) are shown as the propagation axes of the light wave, and the effective refractive index related to the TE mode of each propagation axis is shown. In addition, the effective refractive index related to the TM mode is shown in FIG. 4.

In general, as the thickness t1 of the waveguide layer decreases, the effective refractive index also decreases. A characteristic part of FIG. 4 is that the effective refractive indices in the TE mode and the TM mode are reversed at around t1=0.7 μm. In particular, in the Y propagation and the 45° propagation, there is a region in which the relationship between the effective refractive indices in the TE mode and the TM mode is reversed.

Electromagnetic waves can be coupled from a mode with a high propagation speed (low effective refractive index) to a mode with a low propagation speed (high effective refractive index), but are not capable of being coupled from the mode with a low propagation speed to the mode with a high propagation speed. Therefore, in a region having a thickness greater than 0.7 μm, the effective refractive index in the TM mode is higher than that in the TE mode depending on the propagation direction. This case means that the mode easily shifts from the TE mode to the TM mode. That is, the polarization rotation of the TE mode which is the fundamental mode occurs.

On the other hand, in a region having a thickness less than 0.7 μm, the effective refractive index in the TE mode is higher than that in the TM mode in any propagation direction. Therefore, the TE mode is not capable of being coupled to the TM mode. In general, the TE mode in which the electro-optic effect is stronger is input to an optical modulator using X-cut LN. Therefore, when the thickness of the waveguide layer is less than 0.7 μm and the width of the optical waveguide is sufficient to have a sufficient optical confinement strength, it is possible to suppress unnecessary polarization rotation from the TE mode to the TM mode.

In FIG. 4, the example in which the X-cut LN is used for the waveguide layer has been described. However, in any device that operates in the TE mode, the thickness of the waveguide layer can be controlled in the same manner as described above to suppress the polarization rotation, regardless of the material forming the waveguide layer.

As can be seen from FIG. 4, the effective refractive index in the TE mode of the Z propagation is always higher than that in the TM mode. That is, when the light wave is propagated in only one direction of the Z-axis direction, particularly, the polarization rotation of the TE mode does not occur. However, in a case in which there is a portion in which the propagation direction of the light wave changes in one continuous optical waveguide as in the Z propagation and the Y propagation, polarization rotation occurs in the region in which the effective refractive index is reversed. As shown in FIG. 1A and FIG. 1B, the invention can be more preferably applied to an optical waveguide element in which an optical waveguide is bent at 90 degrees or more.

In addition, the wavelength λ of the light wave is not limited to λ=1.55 μm. For example, when the thickness of the waveguide substrate is normalized with respect to a wavelength around 1.55 μm, for example, in a C-Band (1.52 to 1.57 μm) and an L-Band (1.57 to 1.61 μm), the dispersion curves show almost the same tendency. Further, the thickness (t1) of 0.7 µm of the waveguide layer in FIG. 4 is about 0.45 times the wavelength λ(=1.55 µm) of the light wave. That is, it is understood that the thickness (t1 in FIG. 3) of the optical waveguide in the direction parallel to the fundamental mode (TM mode) having a lower electro-optic effect is preferably less than 0.45 times the wavelength of the light wave propagated through the optical waveguide.

The cross-sectional shape of the optical waveguide shown in FIG. 3 is preferably set such that the thickness (width W) of the optical waveguide in the direction parallel to the fundamental mode (the TE mode, the horizontal direction in FIG. 3) having the higher electro-optic effect is greater than the thickness (height t1) of the optical waveguide in the direction parallel to the fundamental mode (the TM mode, the vertical direction in FIG. 3) having the lower electro-optic effect. When the width (W) of the rib portion is large, the effective refractive index in the TE mode is relatively high, and a difference in the effective refractive index between the modes is large. Therefore, the occurrence of polarization rotation is suppressed more effectively.

In the optical waveguide 2 shown in FIG. 3, the substrate 10 which is a clad is disposed below the waveguide layer (core) 1. Preferably, the refractive index n2 of the substrate 10 is less than 0.8 times the refractive index n1 of the waveguide layer. The reason is that, as the refractive index of a clad portion becomes lower, the effective refractive index in the TM mode becomes relatively lower, and the difference in the effective refractive index between the modes becomes larger.

Figure 5:
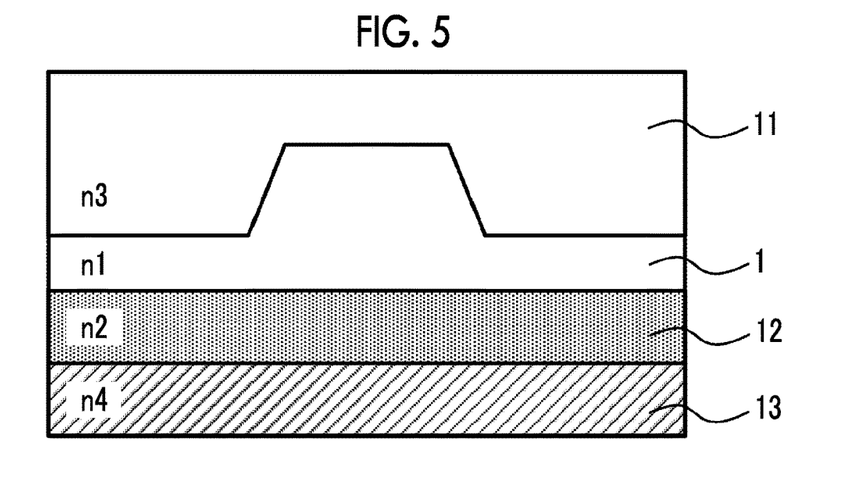
FIG. 5 is a diagram showing an example in which a low-refractive-index layer is disposed on the waveguide layer and a substrate below the waveguide layer is formed by two layers.

As shown in FIG. 5, similarly, in a case in which a low-refractive-index layer 11 is disposed as an upper clad on the waveguide layer 1, it is preferable that the refractive index n3 of the low-refractive-index layer 11 is less than 0.8 times the refractive index n1 of the waveguide layer 1. Further, in a case in which the upper clad 11 is covered with a material (for example, $SiO_2$ or a resin) transparent with respect to the wavelength of light or even in a case in which a material having a refractive index (n2<1.7) different from the refractive index (n2) of the lower clad according to the embodiment is used, the relationship between the dispersion curves shows almost the same tendency as that in FIG. 4. Furthermore, as shown in FIG. 5, the lower clad may not be a single substrate, but may be an intermediate layer 12 between the waveguide layer 1 and a substrate 13. In this case, a material having a higher refractive index than the waveguide layer may be selected for the substrate. For example, a combination of $SiO_2$ for the intermediate layer and Si for the substrate can be used.

Figure 6:
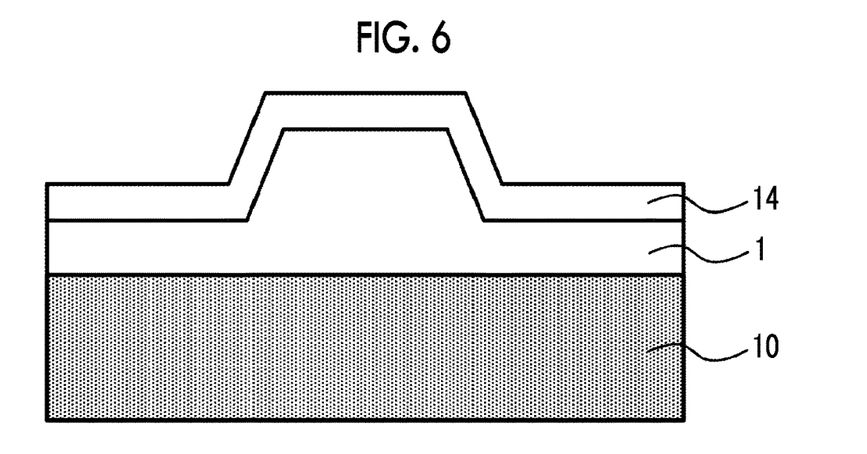
FIG. 6 is a diagram showing an example in which a low-refractive-index film is disposed on the waveguide layer.

In addition, as shown in FIG. 6, the surface of the waveguide may be covered with a thin film 14 in order to smooth the surface of the waveguide. For example, $SiO_2$ can be used as a material forming the thin film 14.

As shown in FIG. 3, for example, in the cross-sectional shape of the optical waveguide, the waveguide layer 1 includes a thin film portion (slab portion) 101 which has a small thickness and contacts with the substrate 10 and the rib portion 102 protruding from the thin film portion. It is preferable that the thickness (t2) of the thin film portion is less than 0.7 times the thickness (t1) of the entire waveguide layer 1. In some cases, the thin film portion may be omitted. As the thin film portion 101 becomes thinner, the optical confinement strength of the rib portion becomes higher, and the leakage of light in a bent portion is more suppressed. In addition, it is possible to suppress the absorption of light at an electrode acting portion.

Figure 7:
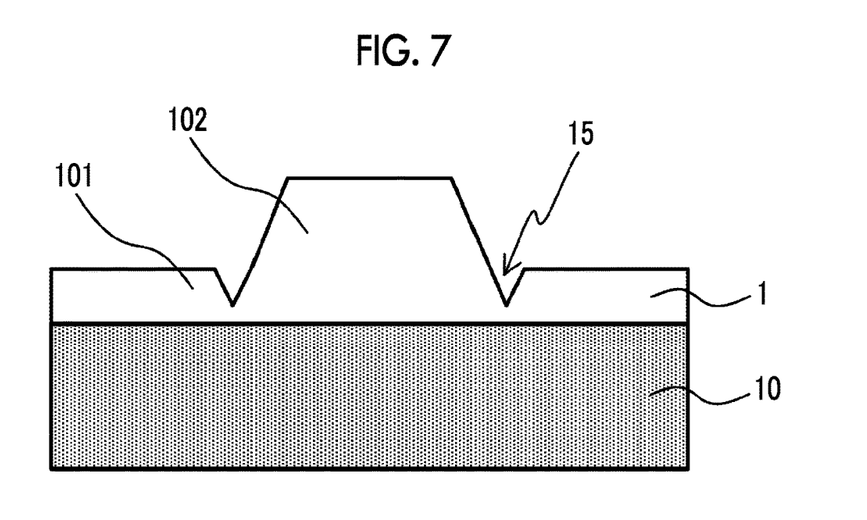
FIG. 7 is a diagram showing an example in which the thickness of a thin film portion on a side surface of a rib portion is set to be thinner in the waveguide layer.

Further, as shown in FIG. 7, it is preferable that grooves 15 are formed in the thin film portion 101 on both sides of the rib portion 102. This also has the effect of increasing the optical confinement strength of the rib portion.

It is preferable that an angle θ formed between the side surface of the rib-type optical waveguide shown in FIG. 3 and a contact surface disposed between the substrate 10 and the waveguide layer 1 is more than 50 degrees, avoiding 45 degrees at which polarization rotation is likely to occur. More ideally, the angle θ is more preferably closer to 90 degrees. The reason is that polarization rotation is less likely to occur in the bent waveguide as the angle θ is closer to 90 degrees.

Figure 8A:
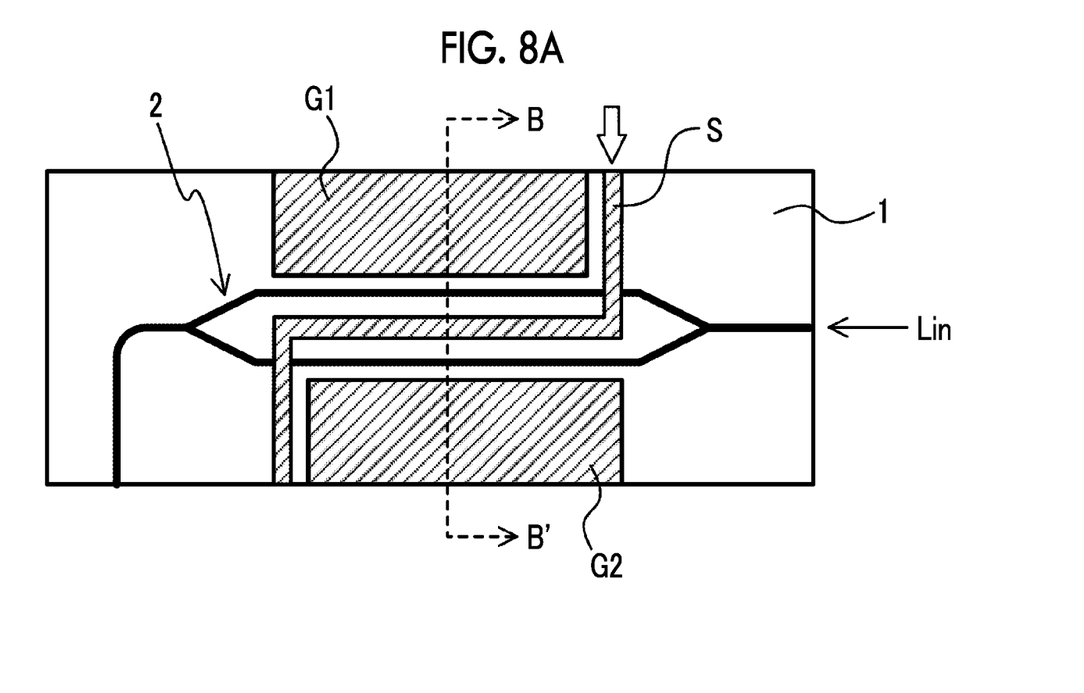
FIG. 8A is a diagram showing the disposition of an optical waveguide pattern, a signal electrode, and the like applicable to the optical waveguide element according to the invention.
Figure 8B:
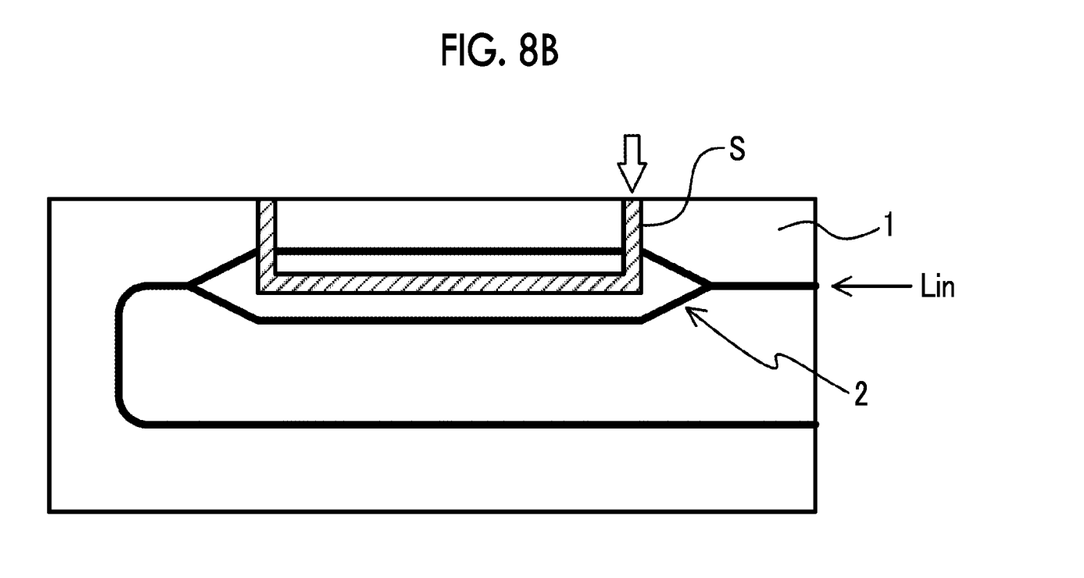
FIG. 8B is a diagram showing the disposition of an optical waveguide pattern, a signal electrode, and the like applicable to the optical waveguide element according to the invention.
Figure 8C:
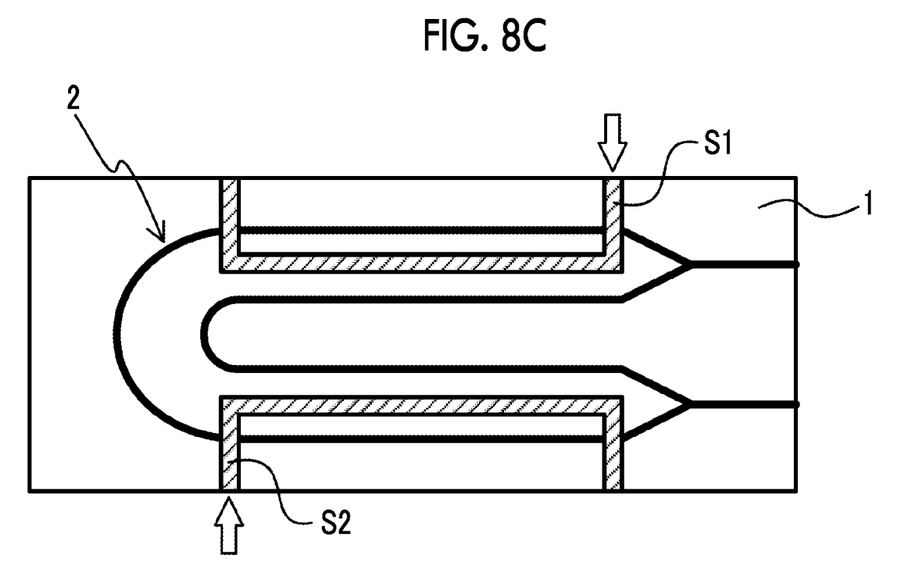
FIG. 8C is a diagram showing the disposition of an optical waveguide pattern, a signal electrode, and the like applicable to the optical waveguide element according to the invention.
Figure 8D:
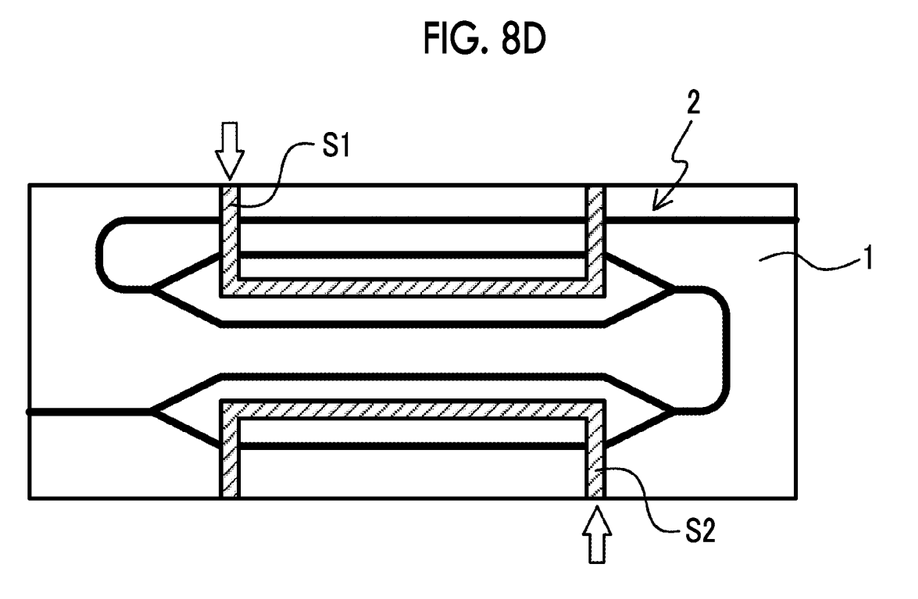
FIG. 8D is a diagram showing the disposition of an optical waveguide pattern, a signal electrode, and the like applicable to the optical waveguide element according to the invention.

FIGS. 8A to 8D are diagrams showing examples of optical waveguide elements having various patterns of optical waveguides FIG. 8A shows a signal electrode S and ground electrodes (G1 and G2) as electrodes, and FIGS. 8B to 8D show only the signal electrode. In addition, an arrow Lin indicates the input of a light wave, and a white arrow indicates the input of an electrical signal.

In FIG. 8A, a wiring line of the optical waveguide is bent at 90 degrees, and one of the input and output is disposed on the side. It goes without saying that the same operation can be performed even though the light wave is input from a direction opposite to the direction indicated by the arrow Lin. In FIG. 8B, the wiring line is folded back 180 degrees such that the input and output are disposed on the same end surface. In FIG. 8C, a branched waveguide portion of a Mach-Zehnder type optical waveguide is folded back. In FIG. 8C, two signal electrodes are used. However, either of the two signal electrodes may be used. Further, FIG. 8D shows an example in which the wiring line is folded back in multiple stages. As described above, the invention is preferably applicable in a case in which the traveling direction of the light wave changes in the middle of the optical waveguide, particularly, in a case in which there is a region in which the traveling directions of the light wave differ by 90 degrees or more in one optical waveguide.

Figure 9:
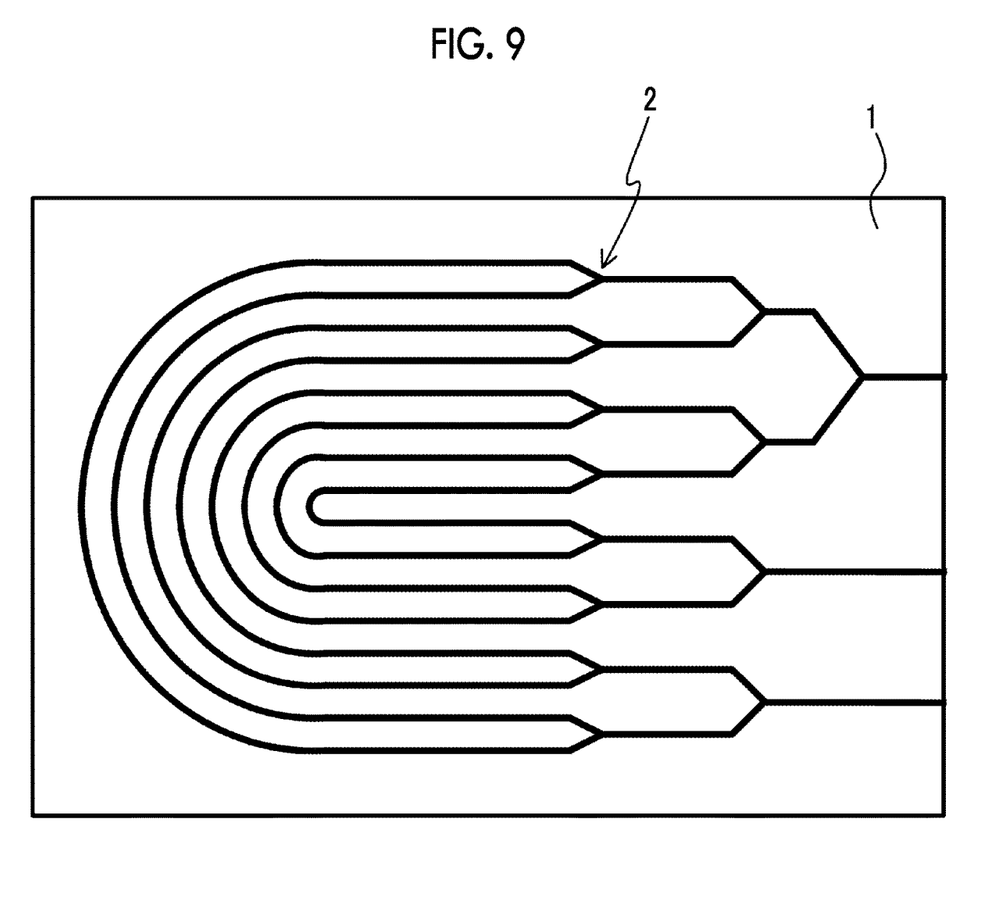
FIG. 9 is a diagram showing an example in which a plurality of Mach-Zehnder type optical waveguides are integrated.

In addition, the invention is applicable not only to the optical waveguide element having the Mach-Zehnder type optical waveguide (MZI interferometer) shown in FIGS. 8A to 8D but also to a phase modulator without the MZI interferometer. Further, the invention can be applied to an optical modulator shown in FIG. 9 into which the MZI interferometer is integrated and which can perform multi-level modulation.

Figure 10:
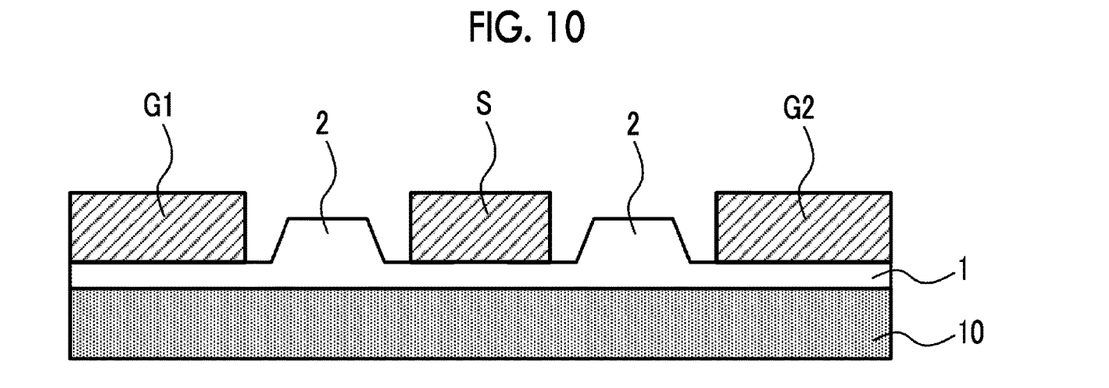
FIG. 10 is a cross-sectional view taken along the dotted line B-B' of FIG. 8A.

FIG. 10 is a cross-sectional view taken along the dotted line B-B' of FIG. 8A. In FIG. 3 and FIGS. 8A to 8D, since the X-cut LN or LT (waveguide layer) is mainly used, the electrodes (the signal electrode S and the ground electrodes G1 and G2) for applying the electric field to the rib-type optical waveguide 2 are disposed on the side surface side of the rib-type optical waveguide such that the rib-type optical waveguide is interposed between the electrodes. It goes without saying that the invention can be similarly applied not only to the X-cut LN or LT but also to Y-cut LN or LT. Further, the invention may also be applied to Z-cut LN or LT. In this case, the difference is only that the direction (Z-axis direction) of the electric field applied to the optical waveguide is the vertical direction in FIG. 3. Therefore, the invention can be applied to suppress polarization rotation. However, in the case of the Z-cut LN or LT, the optical waveguide changes from the X-axis direction to the Y-axis direction. Therefore, polarization rotation does not occur due to the difference in the traveling direction of the light wave. Of course, it is necessary to set the cross-sectional shape of the optical waveguide such that the refractive indices between the TE mode and the TM mode are optimally set to prevent polarization rotation from occurring even when the Z-cut LN or LT is used.

Figure 11A:
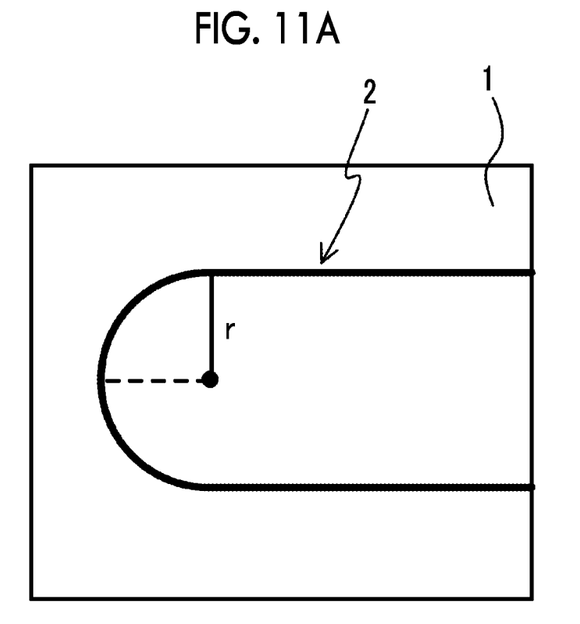
FIG. 11A is a diagram showing an optical waveguide bent with a constant curvature.
Figure 11B:
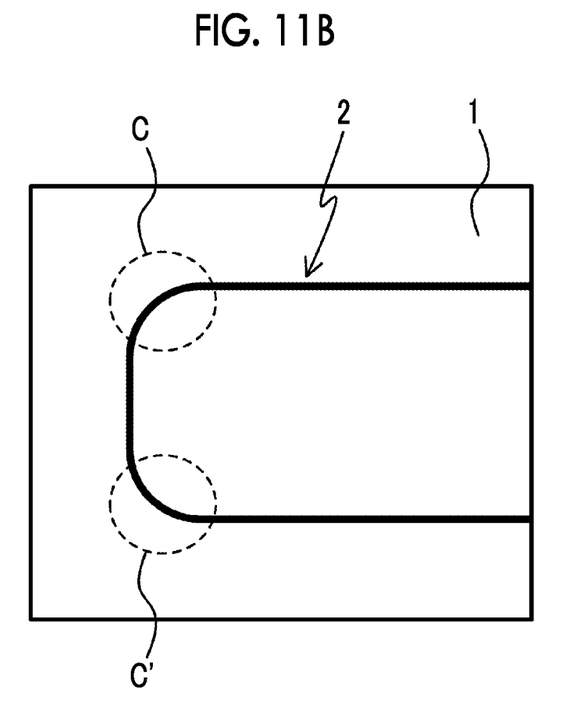
FIG. 11B is a diagram showing an optical waveguide including two portions bent with a small curvature and one straight portion.
Figure 11C:
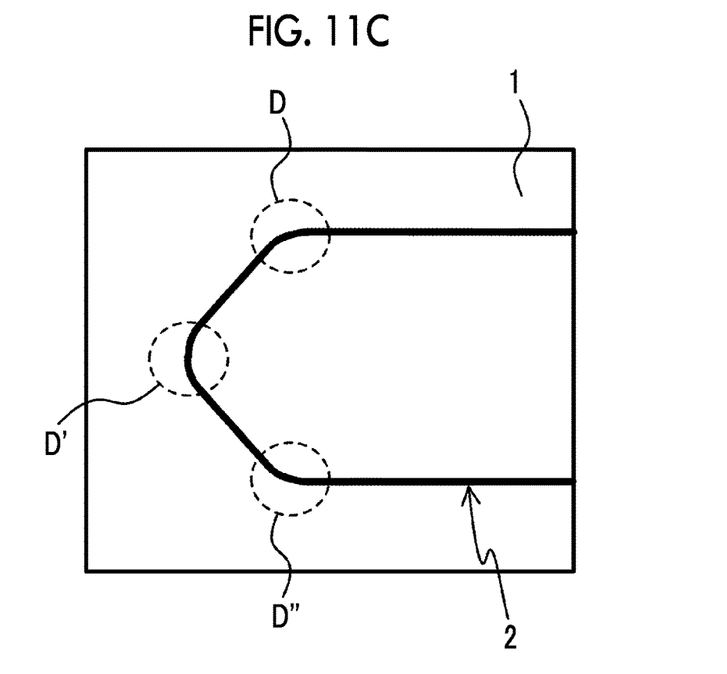
FIG. 11C is a diagram showing an optical waveguide including three portions bent with a small curvature and two straight portions.

FIGS. 11A to 11C show examples of how to bend the optical waveguide 2. As shown in FIG. 11A, the optical waveguide 2 is generally bent with a uniform curvature (radius r). However, the minimum bending radius of the optical waveguide is preferably less than 300 µm. More preferably, the minimum bending radius is less than 200 µm. Further, the minimum bending radius may be less than 100 µm. Therefore, it is possible to change the traveling direction of the optical waveguide in any direction even when the width of the substrate (chip) is limited. In particular, as shown in FIGS. 11B and 11C, the range of a bent portion (dotted lines C, C', D, D', and D") is set to the minimum, and a large number of straight portions are used, which makes it easy to design the layout of the optical waveguide.

Figure 12:
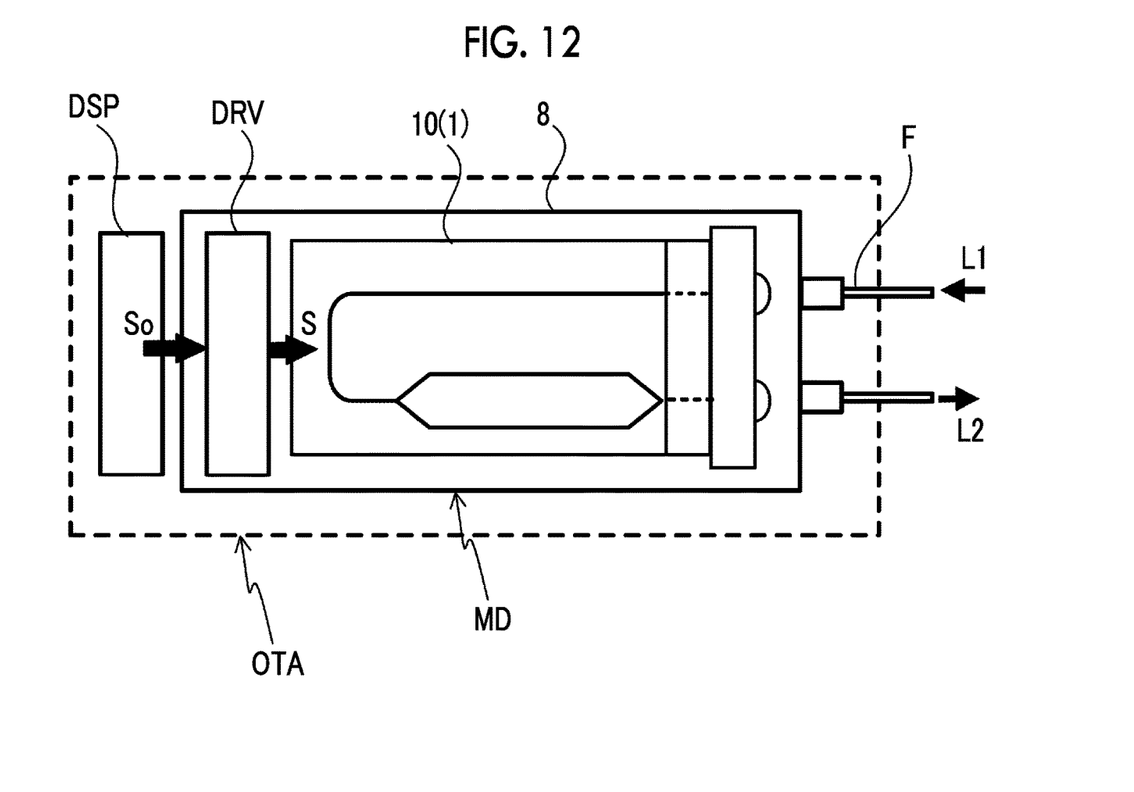
FIG. 12 is a plan view showing an optical modulation device and an optical transmission apparatus according to the invention.

In the optical waveguide element according to the invention, a modulation electrode that modulates the light wave propagated through the optical waveguide is provided on the substrate 10 (waveguide layer 1). Then, the optical waveguide element is accommodated in a case 8 as shown in FIG. 12. In addition, optical fibers (F) for inputting and outputting light waves to the optical waveguide are provided to constitute an optical modulation device MD. The optical fibers not only may be disposed outside the case 8, but also may be introduced into the case through a through-hole that penetrates a side wall of the case and fixed, as shown in FIG. 12.

An electronic circuit (digital signal processor DSP) that outputs a modulation signal for causing the optical modulation device MD to perform a modulation operation can be connected to the optical modulation device MD to constitute an optical transmission apparatus OTA. Since the modulation signal applied to the optical waveguide element needs to be amplified, a driver circuit DRV is used. The driver circuit DRV or the digital signal processor DSP may be disposed outside the case 8 or may be disposed in the case 8. In particular, the driver circuit DRV can be disposed in the case to further reduce the propagation loss of the modulation signal from the driver circuit.

As described above, according to the invention, it is possible to provide an optical waveguide element which suppresses polarization rotation. In addition, it is possible to provide an optical modulation device and an optical transmission apparatus using the optical waveguide element.

What is claimed is:

1. An optical waveguide element comprising:
   a substrate that is X-cut lithium niobate or X-cut lithium tantalate; and
   an optical waveguide that is disposed on the substrate,
   wherein the optical waveguide has an effective refractive index change portion in which an effective refractive index of the optical waveguide related to a fundamental mode A parallel to a plane of polarization of a light wave propagated through the optical waveguide changes according to propagation of the light wave,
   the effective refractive index change portion is one portion of the optical waveguide in which a propagation direction of the light wave is different from Y-axis direction of the substrate, and
   in the effective refractive index change portion, a cross-sectional shape of the optical waveguide which is perpendicular to a propagation direction of the light wave is set such that the effective refractive index of the optical waveguide related to the fundamental mode A is higher than an effective refractive index of the optical waveguide related to another fundamental mode B perpendicular to the fundamental mode A.

2. The optical waveguide element according to claim 1, wherein a relationship between levels of the effective refractive indices related to the fundamental mode A and the fundamental mode B is maintained over the entire effective refractive index change portion.

3. The optical waveguide element according to claim 1, wherein a waveguide layer which is made of a material having an electro-optic effect is disposed on the substrate,
   the optical waveguide is a rib-type optical waveguide that is provided on the waveguide layer,
   electrodes that apply an electric field to the rib-type optical waveguide are formed on the waveguide layer, and
   the fundamental mode A is a fundamental mode in which the electro-optic effect by the electrodes is higher with respect to the light wave propagated through the optical waveguide.

4. The optical waveguide element according to claim 1, wherein the optical waveguide has a portion in which the propagation directions of the light wave differ by 90 degrees or more in at least one continuous optical waveguide.

5. The optical waveguide element according to claim 1, wherein the cross-sectional shape of the optical waveguide in the effective refractive index change portion is set such that a thickness of the optical waveguide in a direction parallel to the fundamental mode B is less than 0.45 times a wavelength of the light wave propagated through the optical waveguide.

6. The optical waveguide element according to claim 1, wherein the cross-sectional shape of the optical waveguide in the effective refractive index change portion is set such that a thickness of the optical waveguide in a direction parallel to the fundamental mode A is larger than a thickness of the optical waveguide in a direction parallel to the fundamental mode B.

7. The optical waveguide element according to claim 1, wherein a refractive index of the substrate is less than 0.8 times a refractive index of a waveguide layer forming the optical waveguide.

8. The optical waveguide element according to claim 1, wherein a low-refractive-index layer is disposed on a side of a waveguide layer forming the optical waveguide opposite to the substrate, and
   a refractive index of the low-refractive-index layer is less than 0.8 times a refractive index of the waveguide layer.

9. The optical waveguide element according to claim 1, wherein the waveguide layer forming the optical waveguide includes a thin film portion which has a small thickness and contacts with the substrate and a rib portion which protrudes from the thin film portion, and
   a thickness of the thin film portion is less than 0.7 times a thickness of the entire waveguide layer.

10. The optical waveguide element according to claim 9, wherein grooves are formed in the thin film portion on both sides of the rib portion.

11. The optical waveguide element according to claim 1, wherein the optical waveguide is a rib-type optical waveguide, and
    an angle formed between a side surface of the rib-type optical waveguide and a contact surface disposed between the substrate and a waveguide layer forming the optical waveguide is more than 50 degrees.

12. The optical waveguide element according to claim 1,
wherein the optical waveguide has a bent portion, and a minimum bending radius of the bending portion is less than 300 µm.

13. The optical waveguide element according to claim 1, wherein the electrodes applying the electric field to the optical waveguide are disposed on lateral sides of the optical waveguide such that the optical waveguide is interposed between the electrodes.

14. An optical modulation device comprising:
the optical waveguide element according to claim 1;
a case that accommodates the optical waveguide element; and
an optical fiber that inputs the light wave to the optical waveguide or outputs the light wave from the optical waveguide.

15. The optical modulation device according to claim 14, further comprising:
an electronic circuit that amplifies a modulation signal input to the optical waveguide element,
wherein the electronic circuit is provided in the case.

16. An optical transmission apparatus comprising:
the optical modulation device according to claim 14; and
an electronic circuit that outputs a modulation signal for causing the optical modulation device to perform a modulation operation.

* * * * *